United States Patent
Chen (10) Patent No.: US 12,176,840 B2
(45) Date of Patent: Dec. 24, 2024

(54) MOTOR DRIVER CAPABLE OF SETTING PULSE WIDTH MODULATION AT COMMUTATION TIME POINTS OF MOTOR

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 244 days.

(21) Appl. No.: 18/147,676

(22) Filed: Dec. 28, 2022

(65) Prior Publication Data

US 2024/0106359 A1    Mar. 28, 2024

(30) Foreign Application Priority Data

Sep. 26, 2022   (TW) .................................. 111136283

(51) Int. Cl.
*H02K 11/33*   (2016.01)
*H02P 6/15*    (2016.01)
*H02P 6/18*    (2016.01)
*H02P 27/08*   (2006.01)

(52) U.S. Cl.
CPC .............. *H02P 6/153* (2016.02); *H02P 6/186* (2013.01); *H02P 27/085* (2013.01); *H02P 2209/09* (2013.01)

(58) Field of Classification Search
CPC ......... H02K 11/33; H02P 27/08; H02P 6/182; H02P 6/153; H02P 6/186; H02P 27/085; H02P 2209/09
See application file for complete search history.

(56) References Cited

U.S. PATENT DOCUMENTS

| | | | |
|---|---|---|---|
| 2010/0181953 A1* | 7/2010 | Cheng ..................... | H02P 27/08 318/400.35 |
| 2018/0234036 A1 | 8/2018 | Pallones et al. | |
| 2018/0358912 A1 | 12/2018 | Iwazaki et al. | |
| 2021/0091688 A1* | 3/2021 | Chen ....................... | H02P 6/182 |
| 2023/0077368 A1* | 3/2023 | Chen ....................... | H02K 11/33 318/400.38 |

FOREIGN PATENT DOCUMENTS

| | | |
|---|---|---|
| CN | 1378335 A | 11/2002 |
| TW | 201843922 A | 12/2018 |
| WO | WO2017094839 A1 | 6/2017 |

* cited by examiner

*Primary Examiner* — Cortez M Cook
(74) *Attorney, Agent, or Firm* — Li & Cai Intellectual Property Office (57) ABSTRACT

A motor driver of setting pulse width modulation at commutation time points of a motor is provided. A commutation control circuit outputs a phase control signal and a commutation starting signal according to a preset phase angle and a commutation signal of the motor. A pulse width modulation calculating circuit determines a starting time point of each of a plurality of cycles of a pulse width modulation signal according to the commutation starting signal. The pulse width modulation calculating circuit determines time of each of the plurality of cycles of the pulse width modulation signal according to the phase control signal. The pulse width modulation calculating circuit determines widths of a plurality of pulse waves of the pulse width modulation signal according to a target rotational speed of the motor. A motor driver circuit drives the motor according to the pulse width modulation signal.

16 Claims, 7 Drawing Sheets

MOTOR DRIVER CAPABLE OF SETTING PULSE WIDTH MODULATION AT COMMUTATION TIME POINTS OF MOTOR

CROSS-REFERENCE TO RELATED PATENT APPLICATION

This application claims the benefit of priority to Taiwan Patent Application No. 111136283, filed on Sep. 26, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver capable of setting pulse width modulation at commutation time points of a motor.

BACKGROUND OF THE DISCLOSURE

In electronic devices, fans are used to cool heat generating components such as processors. When the heat generating components are cooled down by the fans, sensors sense correct data of motors of the fans such that the motors of the fans can be precisely driven to rotate according to the correct data by conventional motor drivers.

The sensors, such as Hall sensors, are often used to sense commutation messages of the motors, such as single-phase motors, and the conventional motor drivers set pulse width modulation signals according to the commutation messages of the motors. However, frequencies of some of a plurality of waveforms of the pulse width modulation signals generated by the conventional motor drivers can often change unexpectedly. As a result, the motors that are driven according to the pulse width modulation signals by the conventional motor drivers generate noise.

SUMMARY OF THE DISCLOSURE

In response to the above-referenced technical inadequacies, the present disclosure provides a motor driver of setting pulse width modulation at commutation time points of a motor. The motor driver includes a motor position detecting circuit, a commutation control circuit, a pulse width modulation calculating circuit and a motor driver circuit. The motor position detecting circuit is disposed on a motor. The motor position detecting circuit is configured to detect a position of a rotor of the motor to output a commutation signal. The commutation control circuit is connected to the motor position detecting circuit. The commutation control circuit is configured to output a phase control signal and a commutation starting signal according to the commutation signal and a preset phase angle. The phase control signal leads the commutation signal, and a difference between the phase control signal and the commutation signal is a preset phase angle. The pulse width modulation calculating circuit is connected to the commutation control circuit. The pulse width modulation calculating circuit determines a starting time point of each of a plurality of cycles of the pulse width modulation signal, according to the commutation starting signal. The pulse width modulation calculating circuit determines time of a time interval of each of the plurality of cycles of the pulse width modulation signal, according to the phase control signal. The pulse width modulation calculating circuit determines widths of a plurality of pulse waves of the pulse width modulation signal in each of the plurality of cycles, according to a target rotational speed of the motor. The pulse width modulation calculating circuit sequentially generates the plurality of pulse waves of the pulse width modulation signal from the starting time point within the time interval. The pulse width modulation calculating circuit outputs the pulse width modulation signal. The motor driver circuit is connected to the pulse width modulation calculating circuit and the motor. The motor driver circuit is configured to drive the motor according to the pulse width modulation signal from the pulse width modulation calculating circuit.

In certain embodiments, the motor driver circuit is connected to the motor position detecting circuit and the commutation control circuit. The motor driver circuit is configured to drive the motor according to the commutation signal and the phase control signal.

In certain embodiments, the pulse width modulation calculating circuit, according to a preset soft switching signal, sequentially generates some of the plurality of pulse waves of the pulse width modulation signal within a soft switching time interval of each of the plurality of cycles of the pulse width modulation signal. The earlier the pulse wave is generated among the plurality of pulse waves, the smaller the width of the pulse wave is. The later the pulse wave is generated among the plurality of pulse waves, the larger the width of the pulse wave is.

In certain embodiments, the pulse width modulation calculating circuit, according to a preset off-time signal, sets the pulse width modulation signal to be maintained at a low level within an off-time interval of each of the plurality of cycles of the pulse width modulation signal.

In certain embodiments, the pulse width modulation calculating circuit aligns an upper limit time point of the soft switching time interval of any one of the plurality of cycles of the pulse width modulation signal with a time point of a rising edge of one of a plurality of waveforms of the phase control signal. The pulse width modulation calculating circuit aligns a lower limit time point of the off-time interval of the one of the plurality of cycles of the pulse width modulation signal with a time point of a falling edge of the one of the plurality of waveforms of the phase control signal.

In certain embodiments, the pulse width modulation calculating circuit aligns an upper limit time point of the soft switching time interval of a next one of the plurality of cycles of the pulse width modulation signal with the time point of the falling edge of the one of the plurality of waveforms of the phase control signal. The pulse width modulation calculating circuit aligns a lower limit time point of the off-time interval of the next one of the plurality of cycles of the pulse width modulation signal with a time point of a rising edge of a next one of the plurality of waveforms of the phase control signal.

In certain embodiments, the pulse width modulation calculating circuit determines time of the off-time interval according to a dead time of the motor driver circuit.

In certain embodiments, the time of the off-time interval is equal to the dead time.

In certain embodiments, a rising edge of any one of a plurality of pulse waves of the commutation starting signal is aligned with a rising edge of a waveform of the phase control signal.

In certain embodiments, a rising edge of a next one of the plurality of pulse waves of the commutation starting signal is aligned with a falling edge of the waveform of the phase control signal.

In certain embodiments, the commutation control circuit includes a pulse signal generating circuit and a counter. The pulse signal generating circuit is connected to the motor position detecting circuit and the pulse width modulation calculating circuit. The pulse signal generating circuit is configured to output a first pulse signal according to the commutation signal. The counter is connected to the pulse signal generating circuit. The counter is configured to perform a counting operation on the first pulse signal to output a counting signal. The pulse signal generating circuit outputs the phase control signal and the commutation starting signal according to the counting signal and the preset phase angle.

In certain embodiments, the pulse signal generating circuit includes a first pulse signal generator and a second pulse signal generator. The first pulse signal generator is connected to the motor position detecting circuit and the counter. The first pulse signal generator is configured to output the first pulse signal to the counter according to the commutation signal. The second pulse signal generator is connected to the counter and the pulse width modulation calculating circuit. The second pulse signal generator is configured to output the phase control signal and the commutation starting signal according to the counting signal and the preset phase angle.

In certain embodiments, the counter, according to a clock signal, performs the counting operation on the first pulse signal to output the counting signal.

In certain embodiments, the commutation control circuit includes a pulse signal generating circuit, a counter and a logic circuit. The pulse signal generating circuit is connected to the motor position detecting circuit and the pulse width modulation calculating circuit. The pulse signal generating circuit is configured to output a first pulse signal according to the commutation signal. The counter is connected to the pulse signal generating circuit. The counter is configured to perform a counting operation on the first pulse signal to output a counting signal. The logic circuit is connected to the counter and the pulse signal generating circuit. The logic circuit is configured to output the phase control signal and a logic signal according to the counting signal and the preset phase angle. The pulse signal generating circuit outputs the commutation starting signal according to the logic signal.

In certain embodiments, the pulse signal generating circuit includes a first pulse signal generator and a second pulse signal generator. The first pulse signal generator is connected to the motor position detecting circuit and the counter. The first pulse signal generator is configured to output the first pulse signal to the counter according to the commutation signal. The second pulse signal generator is connected to the counter and the pulse width modulation calculating circuit. The second pulse signal generator is configured to output the commutation starting signal according to the logic signal.

In certain embodiments, the counter, according to a clock signal, performs the counting operation on the first pulse signal to output the counting signal.

As described above, the present disclosure provides the motor driver of setting the pulse width modulation at the commutation time points of the motor. When the motor commutates, the pulse width modulation calculating circuit of the motor driver of the present disclosure outputs the pulse width modulation signal having a full period. As a result, in a fan, the motor that is driven according to the pulse width modulation signal by the motor driver circuit is prevented from generating noise and vibrating. Before the motor commutates, the pulse width modulation signal is maintained at the low level to decrease a current of the motor to a zero value within the dead time. Then, when the motor commutates, the motor generates the current as normal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
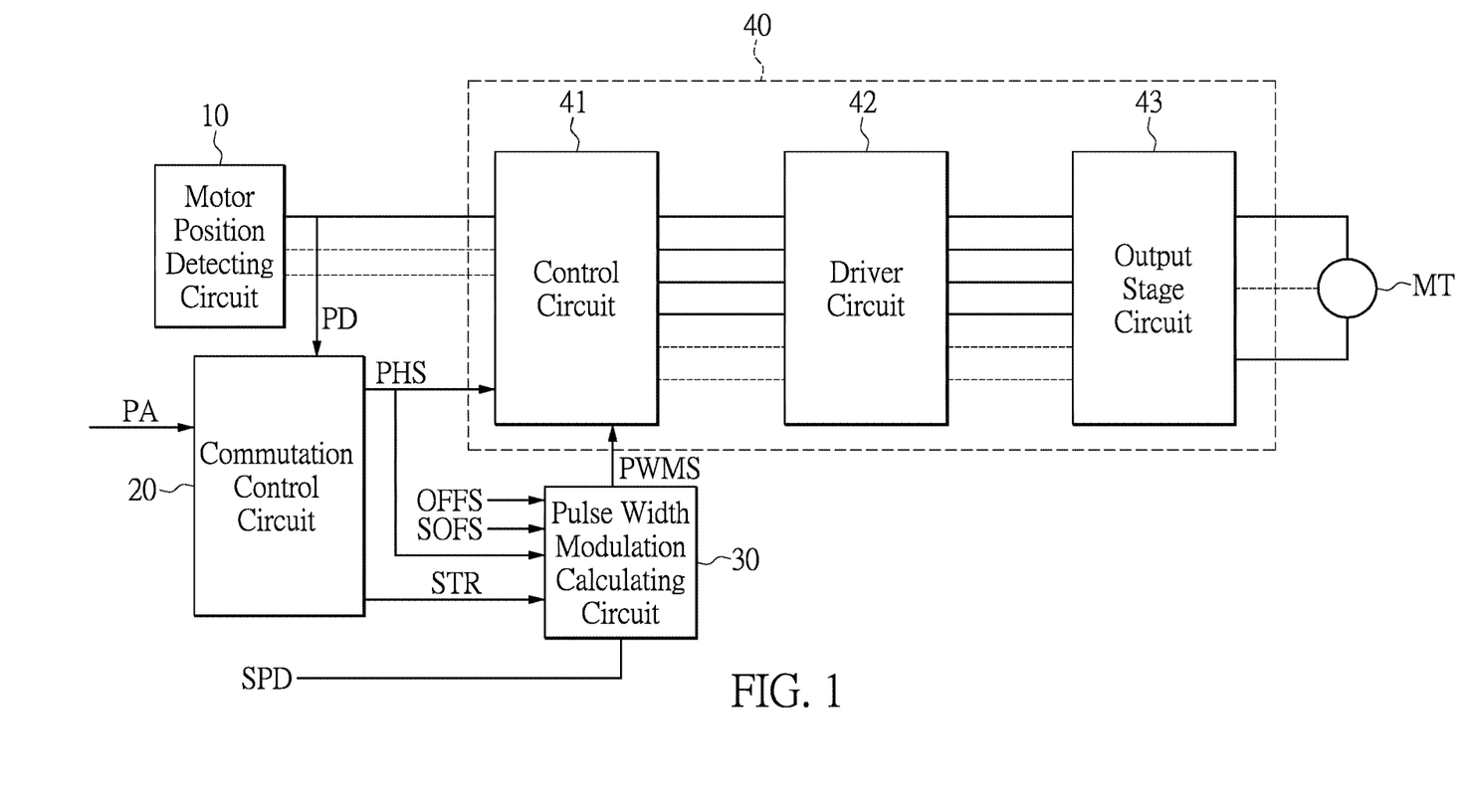
FIG. 1 is a block diagram of a motor driver of setting pulse width modulation at commutation time points of a motor according to a first embodiment of the present disclosure.

Reference is made to FIG. 1 and FIGS. 4 to 7, in which FIG. 1 is a block diagram of a motor driver of setting pulse width modulation at commutation time points of a motor according to a first embodiment of the present disclosure, and FIGS. 4 to 7 are waveform diagrams of signals of the motor driver of setting the pulse width modulation at the commutation time points of the motor according to the first to third embodiments of the present disclosure.

As shown in FIG. 1, the motor driver of the present disclosure includes a motor position detecting circuit 10, a commutation control circuit 20, a pulse width modulation calculating circuit 30 and a motor driver circuit 40. The motor driver circuit 40 may include a control circuit 41, a driver circuit 42 and an output stage circuit 43.

The motor position detecting circuit 10 is connected to the commutation control circuit 20 and the control circuit 41 of the motor driver circuit 40. The commutation control circuit 20 is connected to the pulse width modulation calculating circuit 30 (and the control circuit 41 of the motor driver circuit 40). The pulse width modulation calculating circuit 30 is connected to the control circuit 41 of the motor driver circuit 40. In the motor driver circuit 40, the driver circuit 42 is connected to the control circuit 41 and the output stage circuit 43. The output stage circuit 43 of the motor driver circuit 40 is connected to a motor MT such as a single-phase motor and a three-phase motor.

Figure 7:
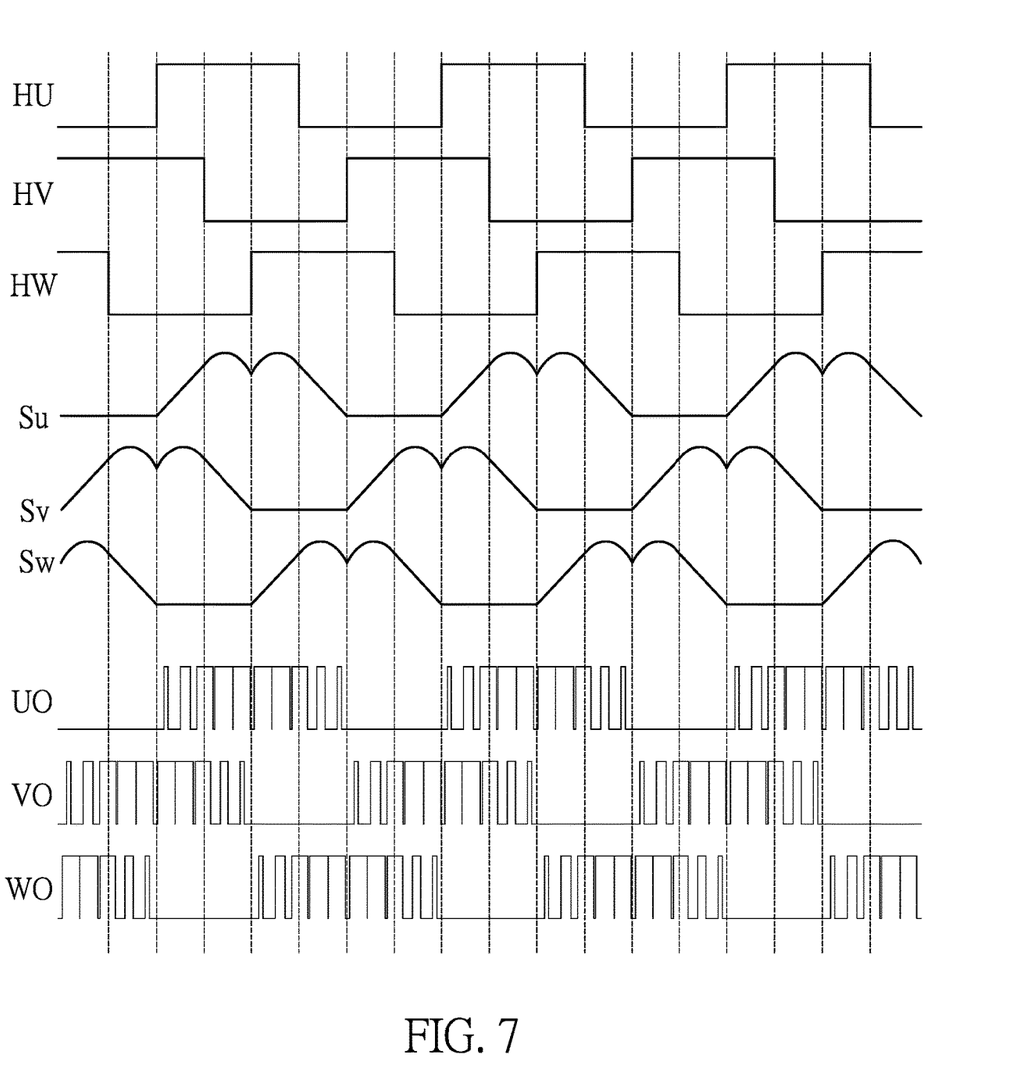
FIG. 7 is a waveform diagram of signals of the motor driver of setting the pulse width modulation at the commutation time points of the motor according to the first to third embodiments of the present disclosure.

The motor position detecting circuit 10 may include one or more Hall sensors and may be disposed on the motor MT. The motor position detecting circuit 10 may detect a position of a rotor of the motor MT to output one or more commutation signals such as a commutation signal PD as shown in FIGS. 1 to 5 or commutation signals HU, HV, HW respectively of U, V and W phases of the motor MT as shown in FIG. 7. For the convenience of description, only the commutation signal PD is described in the following. In practice, the commutation signal PD described in the following may be replaced with each or any one of the commutation signals HU, HV, HW.

Figure 4:
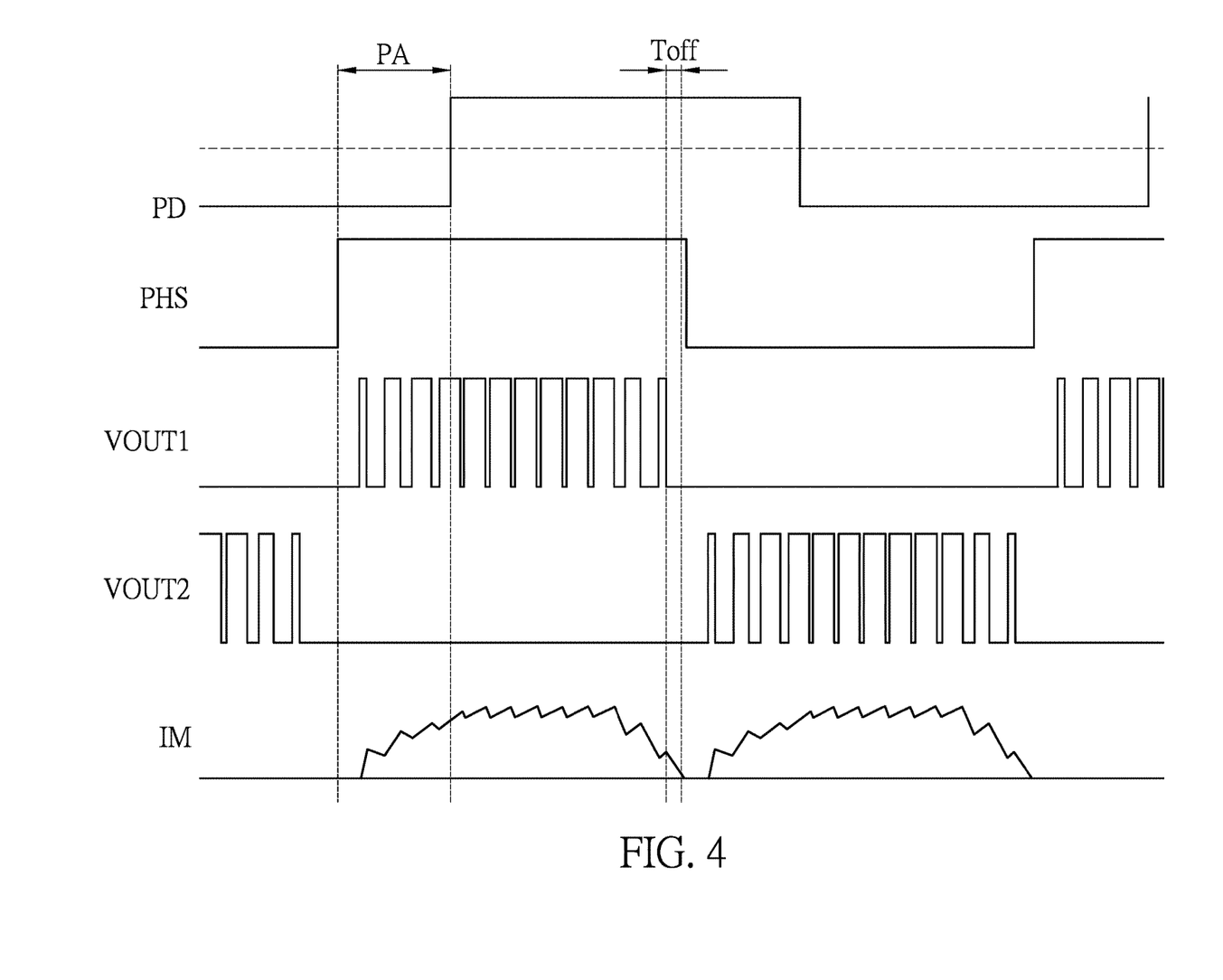
FIG. 4 is a waveform diagram of signals of the motor driver of setting the pulse width modulation at the commutation time points of the motor according to the first to third embodiments of the present disclosure.
Figure 5:
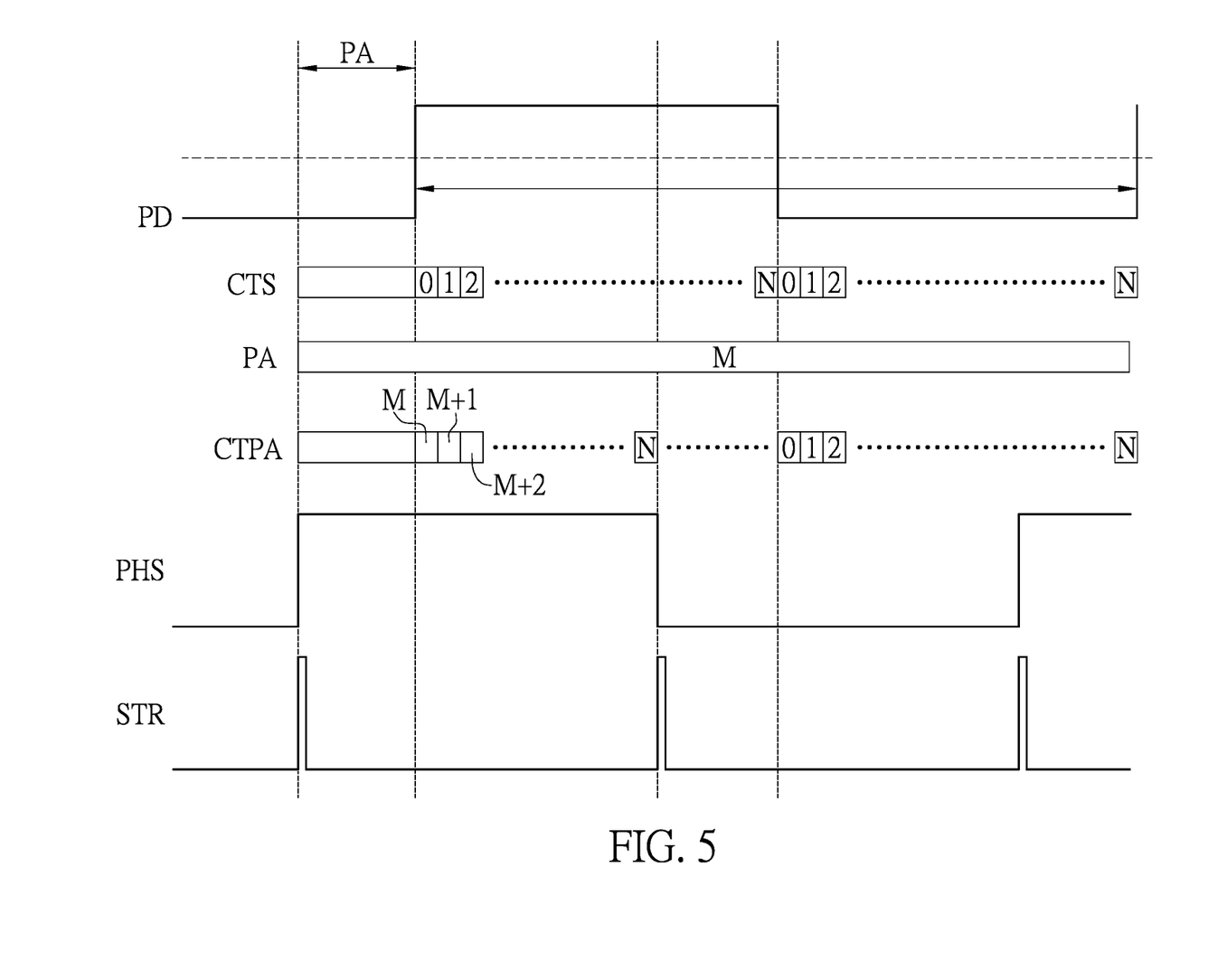
FIG. 5 is a waveform diagram of signals of the motor driver of setting the pulse width modulation at the commutation time points of the motor according to the first to third embodiments of the present disclosure.

The commutation control circuit 20 may, according to a commutation signal PD from the motor position detecting circuit 10 and a preset phase angle PA (from an external phase determining circuit), determine that a phase control signal PHS leads a commutation signal PD, determine that a phase difference between the phase control signal PHS and the commutation signal PD is a preset phase angle PA as shown in FIGS. 4 and 5, and determine a time within which each of a plurality of pulse waves of a commutation starting signal STR is generated.

Figure 6:
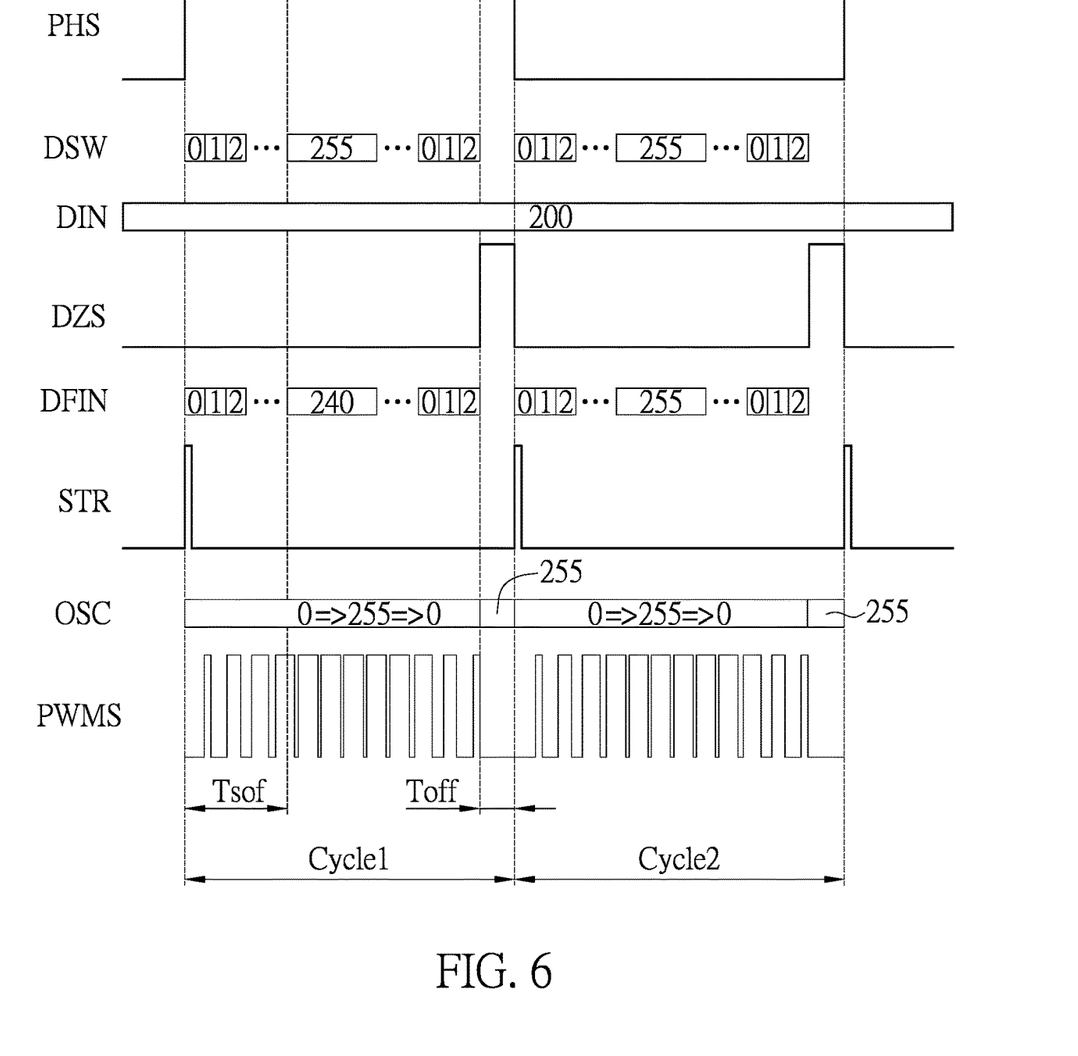
FIG. 6 is a waveform diagram of signals of the motor driver of setting the pulse width modulation at the commutation time points of the motor according to the first to third embodiments of the present disclosure.

As shown in FIGS. 5 and 6, a rising edge of one of the plurality of pulse waves of the commutation starting signal STR is aligned with a rising edge of one of a plurality of pulse waves of the phase control signal PHS. A rising edge of a next one of the plurality of pulse waves of the commutation starting signal STR is aligned with a falling edge of the one of the plurality of pulse waves of the phase control signal PHS.

It is worth noting that, the pulse width modulation calculating circuit may, according to the commutation starting signal STR from the commutation control circuit 20, determine a starting time point of each of a plurality of cycles of the pulse width modulation signal PWMS.

The rising edge of each of the plurality of pulse waves of the commutation starting signal STR may be aligned with the starting time point of each of the plurality of cycles of the pulse width modulation signal PWMS. As shown in FIG. 6, a rising edge of a first one of the plurality of pulse waves of the commutation starting signal STR is aligned with the starting time point of a first cycle Cycle1 among the plurality of cycles of the pulse width modulation signal PWMS. A rising edge of a second one of the plurality of pulse waves of the commutation starting signal STR is aligned with the starting time point of a second cycle Cycle2 among the plurality of cycles of the pulse width modulation signal PWMS.

The pulse width modulation calculating circuit 30 may, according to the commutation starting signal STR from the commutation control circuit 20, determine time and an ending time point of a time interval of each of the plurality of cycles of the pulse width modulation signal PWMS.

As shown in FIG. 6, a time length of the first cycle Cycle1 of the pulse width modulation signal PWMS is a working period of the phase control signal PHS. A time length of the second cycle Cycle2 of the pulse width modulation signal PWMS is a non-working period of the phase control signal PHS.

As shown in FIG. 6, an upper limit time point of the first cycle Cycle1 of the pulse width modulation signal PWMS is aligned with a time point of a rising edge of a first one of the plurality of waveforms of the phase control signal PHS. A lower limit time point of the first cycle Cycle1 of the pulse width modulation signal PWMS is aligned with a time point of a falling edge of the first one of the plurality of waveforms of the phase control signal PHS.

As shown in FIG. 6, an upper limit time point of the second cycle Cycle2 of the pulse width modulation signal PWMS is aligned with the time point of the falling edge of the first one of the plurality of waveforms of the phase control signal PHS. A lower limit time point of the second cycle Cycle2 of the pulse width modulation signal PWMS is aligned with a time point of a rising edge of a second one of the plurality of waveforms of the phase control signal PHS.

The pulse width modulation calculating circuit 30, according to a target rotational speed of the motor MT (that is indicated by a motor rotational speed indication signal SPD from an external speed control circuit), determine widths and frequencies of a plurality of pulse waves of the pulse width modulation signal PWMS in each of the plurality of cycles of the pulse width modulation signal PWMS.

The pulse width modulation calculating circuit 30 sequentially generates the plurality of pulse waves of the pulse width modulation signal PWMS from the starting time point within the time interval.

If necessary, the pulse width modulation calculating circuit 30 may, according to a preset soft switching signal SOFS (from the external speed control circuit), determine a soft switching time interval of each of the plurality of cycles of the pulse width modulation signal PWMS such as a soft switching time interval Tsof as shown in FIG. 6. In addition, the pulse width modulation calculating circuit 30 may, according to a preset soft switching signal SOFS, determine the number and the widths of the plurality of pulse waves of the pulse width modulation signal PWMS within the soft switching time interval of each of the plurality of cycles of the pulse width modulation signal PWMS. As shown in FIG. 6, within the soft switching time interval Tsof, the earlier the pulse wave is generated, the smaller the width of the pulse wave is. The later the pulse wave is generated, the larger the width of the pulse wave is.

For example, the pulse width modulation calculating circuit 30 may generate a final cycle counting value DFIN according to a soft switching working period count value DSW and an input working period count value DIN as shown in FIG. 6. The pulse width modulation calculating circuit 30 may, according to the final cycle counting value DFIN, set time of the soft switching time interval (such as the soft switching time interval Tsof of the first cycle Cycle1 as shown in FIG. 6) and an entire of the time of each of the plurality of cycles (such as the first cycle Cycle1 as shown in FIG. 6) of the pulse width modulation signal PWMS. When a counter (such as a counter 22 shown in FIG. 2 or FIG. 3) of the commutation control circuit 20 counts from 0 to 255 and then counts from 255 back to 0 in an oscillating signal OSC as shown in FIG. 6, one of the plurality of cycles of the pulse width modulation signal PWMS is completed.

The pulse width modulation calculating circuit 30 may, according to a preset off-time signal (indicating a dead time of the motor driver circuit 40) from the external speed control circuit, set time of an off-time interval Toff of each of the plurality of cycles of the pulse width modulation signal PWMS as shown in FIG. 6, and set the pulse width modulation signal to be maintained at a low level within the off-time interval Toff. The time of the off-time interval Toff of the pulse width modulation signal PWMS may be equal to the dead time. For example, the dead time may be a working period of a waveform of a dead time signal DZS as shown in FIG. 6.

For example, the pulse width modulation calculating circuit 30 may, according to the phase control signal PHS, align an upper limit time point of the soft switching time interval Toff of the first cycle Cycle1 of the pulse width modulation signal PWMS with the time point of the rising edge of the first one of the plurality of waveforms of the phase control signal PHS as shown in FIG. 6. The pulse width modulation calculating circuit 30 may align a lower limit time point of the off-time interval Toff of the first cycle Cycle1 of the pulse width modulation signal PWMS with the time point of the falling edge of the first one of the plurality of waveforms of the phase control signal PHS.

For example, the pulse width modulation calculating circuit 30 may, according to the phase control signal PHS, align an upper limit time point of the soft switching time interval Toff of the second cycle Cycle2 of the pulse width modulation signal PWMS with the time point of the falling edge of the first one of the plurality of waveforms of the phase control signal PHS as shown in FIG. 6. The pulse width modulation calculating circuit 30 may align a lower limit time point of the off-time interval Toff of the second cycle Cycle2 of the pulse width modulation signal PWMS with the time point of the rising edge of the second one of the plurality of waveforms of the phase control signal PHS.

For example, the control circuit 41 of the motor driver circuit 40 may output one or more control signals, according to the pulse width modulation signal PWMS as shown in FIGS. 1 and 6, the phase control signal PHS as shown in FIGS. 1 to 6, the commutation signal PD as shown in FIGS. 1 to 5 and any one or more of third harmonic signals Su, Sv, Sw as shown in FIG. 7.

The driver circuit 42 of the motor driver circuit 40 may output one or more driving signals according to the one or more control signal from the control circuit 41.

The output stage circuit 43 of the motor driver circuit 40 operates to output one or more output stage signals to the motor MT according to the one or more driving signals from the driver circuit 42 to drive the motor MT.

As a result, if the motor MT is the single-phase motor, a current signal of the motor MT may be a current signal IM as shown in FIG. 4, an output voltage signal of a first output terminal of the motor MT may be a first output voltage signal VOUT1 as shown in FIG. 4, and an output voltage signal of a second output terminal of the motor MT may be a second output voltage signal VOUT2 as shown in FIG. 4. If the motor MT is the three-phase motor, output voltage signals of the U, V and W phases of the motor MT may be output voltage signals UO, VO and WO as shown in FIG. 7.

Figure 2:
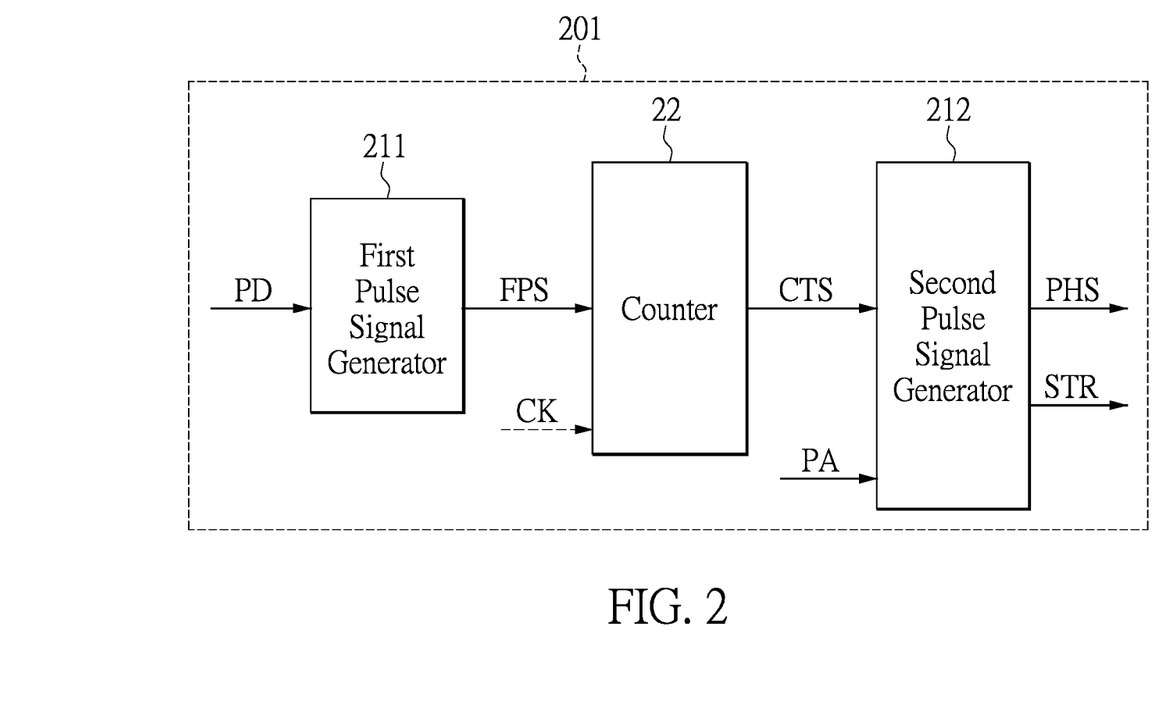
FIG. 2 is a block diagram of a commutation control circuit of a motor driver of setting pulse width modulation at commutation time points of a motor according to a second embodiment of the present disclosure.

Reference is made to FIG. 2, which is a block diagram of a commutation control circuit of a motor driver of setting pulse width modulation at commutation time points of a motor according to a second embodiment of the present disclosure.

The motor driver of the second embodiment of the present disclosure may include a commutation control circuit 201 as shown in FIG. 2. The commutation control circuit 20 shown in FIG. 1 may be replaced with the commutation control circuit 201 shown in FIG. 2.

As shown in FIG. 2, the commutation control circuit 201 may include the counter 22 and a pulse signal generating circuit, wherein the pulse signal generating circuit may include a first pulse signal generator 211 and a second pulse signal generator 212.

The first pulse signal generator 211 of the commutation control circuit 201 as shown in FIG. 2 may be connected to the motor position detecting circuit as shown in FIG. 1.

As shown in FIG. 2, in the commutation control circuit 201, the counter 22 may be connected to the pulse signal generator 211 and the second pulse signal generator 212.

The second pulse signal generator 212 of the commutation control circuit 201 as shown in FIG. 2 may be connected to the pulse width modulation calculating circuit 30 and the control circuit 41 of the motor driver circuit 40 as shown in FIG. 1.

First, the first pulse signal generator 211 of the commutation control circuit 201 may output a first pulse signal FPS according to the commutation signal PD from the motor position detecting circuit 10.

The counter 22 of the commutation control circuit 201 may, (according to a clock signal CK from an external clock circuit), perform a counting operation on the first pulse signal FPS from the first pulse signal generator 211 to output a counting signal CTS.

The second pulse signal generator 212 of the commutation control circuit 201 may, according to the counting signal CTS from the counter 22 and the preset phase angle PA (from the external phase determining circuit), output the phase control signal PHS to the pulse width modulation calculating circuit (and the control circuit 41 of the motor driver circuit 40), and output the commutation starting signal STR to the pulse width modulation calculating circuit 30.

Figure 3:
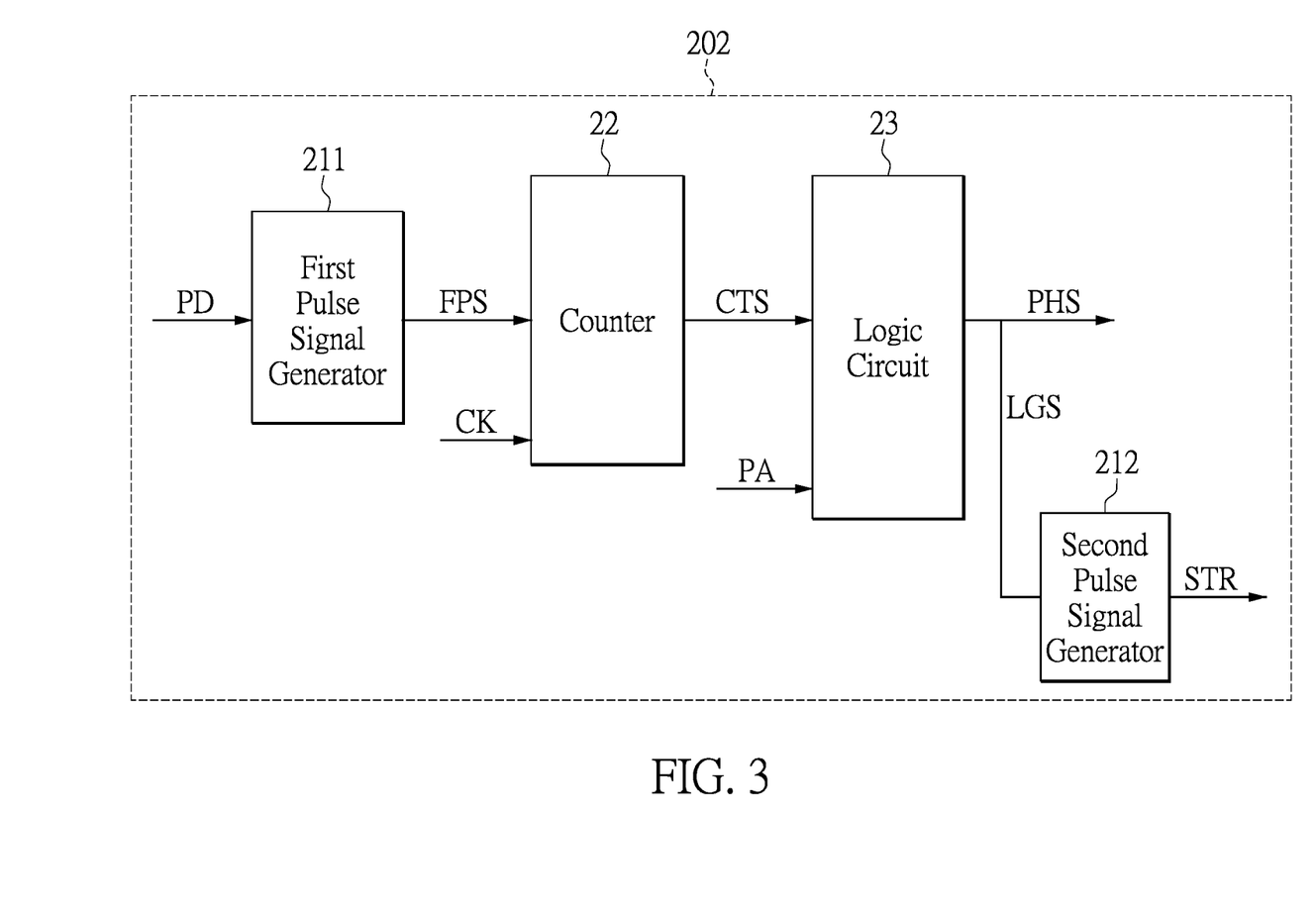
FIG. 3 is a block diagram of a commutation control circuit of a motor driver of setting pulse width modulation at commutation time points of a motor according to a third embodiment of the present disclosure.

Reference is made to FIGS. 3 and 5, in which FIG. 3 is a block diagram of a commutation control circuit of a motor driver of setting pulse width modulation at commutation time points of a motor according to a third embodiment of the present disclosure, and FIG. 5 is a waveform diagram of signals of the motor driver of setting the pulse width modulation at the commutation time points of the motor according to the first to third embodiments of the present disclosure.

The motor driver of the third embodiment of the present disclosure may include a commutation control circuit 202 as shown in FIG. 3. The commutation control circuit 20 as shown in FIG. 1 may be replaced with the commutation control circuit 202 as shown in FIG. 3.

As shown in FIG. 2, the commutation control circuit 201 may include the counter 22, a logic circuit 23 and the pulse signal generating circuit, wherein the pulse signal generating circuit may include the first pulse signal generator 211 and the second pulse signal generator 212.

The commutation control circuit 202 of the first pulse signal generator 211 as shown in FIG. 3 may be connected to the motor position detecting circuit as shown in FIG. 1.

As shown in FIG. 3, in the commutation control circuit 202, the counter 22 may be connected to the first pulse signal generator 211 and the logic circuit 23, and the logic circuit 23 may be connected to the second pulse signal generator 212.

The logic circuit 23 of the commutation control circuit 202 as shown in FIG. 3 may be connected to the pulse width modulation calculating circuit 30 (and the control circuit 41 of the motor driver circuit 40) as shown in FIG. 1, and may be connected to the second pulse signal generator 212 of the commutation control circuit 202 as shown in FIG. 3.

The second pulse signal generator 212 of the commutation control circuit 202 as shown in FIG. 3 may be connected to the pulse width modulation calculating circuit 30 as shown in FIG. 1.

First, the first pulse signal generator 211 of the commutation control circuit 202 may output the first pulse signal FPS according to the commutation signal PD from the motor position detecting circuit 10.

The counter 22 of the commutation control circuit 202 may, (according to the clock signal CK from the external clock circuit), perform the counting operation on the first pulse signal FPS from the first pulse signal generator 211 to output the counting signal CTS.

The logic circuit 23 of the commutation control circuit 202 may, according to the counting signal CTS from the counter 22 and the preset phase angle PA (from the external phase determining circuit), output the phase control signal PHS to the pulse width modulation calculating circuit 30 (and the control circuit 41 of the motor driver circuit 40) as shown in FIG. 1, and output a logic signal LGS to the second pulse signal generator 212 of the commutation control circuit 202 as shown in FIG. 3.

The second pulse signal generator 212 of the commutation control circuit 202 as shown in FIG. 3 may, according to the logic signal LGS from the logic circuit 23, output the commutation starting signal STR to the pulse width modulation calculating circuit 302 as shown in FIG. 1.

For example, as shown in FIG. 5, the counter 22 counts from the time point of the rising edge of the first one of the plurality of pulse waves of the commutation starting signal STR (which is the starting time point of first cycle Cycle1 of the pulse width modulation signal PWMS as shown in FIG. 6). When a value counted by the counter 22 reaches the count value M, the current time reaches a transition time point of the commutation signal PD (that is a commutation time point of the motor MT). The count value M represents a count value of the preset phase angle PA that is the phase difference between the commutation signal PD and the phase control signal PHS leading the commutation signal PD.

Then, as shown in FIG. 5, the counter 22 counts from the count value M in a phase counting signal CTPA at the transition time point of the commutation signal PD (that is the commutation time point of the motor MT). When a value counted by the counter 22 reaches a count value N, the first cycle Cycle1 of the pulse width modulation signal PWMS is completed as shown in FIG. 6. At this time, the current time reaches the time point of the rising edge of the second one of the plurality of pulse waves of the commutation starting signal STR (which is the starting time point of the second cycle Cycle2 of the pulse width modulation signal PWMS as shown in FIG. 6).

In conclusion, the present disclosure provides the motor driver of setting the pulse width modulation at the commutation time points of the motor. When the motor commutates, the pulse width modulation calculating circuit of the motor driver of the present disclosure outputs the pulse width modulation signal that have the full period. As a result, in a fan, the motor that is driven according to the pulse width modulation signal by the motor driver circuit is prevented from generating noise and vibrating. Before the motor commutates, the pulse width modulation signal is maintained at the low level to decrease a current of the motor to a zero value within the dead time. Then, when the motor commutates, the motor generates the current as normal.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver capable of setting pulse width modulation at commutation time points of a motor, comprising:
    a motor position detecting circuit disposed on a motor and configured to detect a position of a rotor of the motor to output a commutation signal;
    a commutation control circuit connected to the motor position detecting circuit, and configured to output a phase control signal and a commutation starting signal according to the commutation signal and a preset phase angle, wherein the phase control signal leads the commutation signal, and a difference between the phase control signal and the commutation signal is a preset phase angle;
    a pulse width modulation calculating circuit connected to the commutation control circuit, wherein the pulse width modulation calculating circuit determines a starting time point of each of a plurality of cycles of the pulse width modulation signal according to the commutation starting signal, the pulse width modulation calculating circuit determines time of a time interval of each of the plurality of cycles of the pulse width modulation signal according to the phase control signal, the pulse width modulation calculating circuit determines widths of a plurality of pulse waves of the pulse width modulation signal in each of the plurality of cycles according to a target rotational speed of the motor, the pulse width modulation calculating circuit sequentially generates the plurality of pulse waves of the pulse width modulation signal from the starting time point within the time interval, and the pulse width modulation calculating circuit outputs the pulse width modulation signal; and a motor driver circuit connected to the pulse width modulation calculating circuit and the motor, and configured to drive the motor according to the pulse width modulation signal from the pulse width modulation calculating circuit.

2. The motor driver according to claim 1, wherein the motor driver circuit is connected to the motor position detecting circuit and the commutation control circuit, and configured to drive the motor according to the commutation signal and the phase control signal.

3. The motor driver according to claim 1, wherein the pulse width modulation calculating circuit, according to a preset soft switching signal, sequentially generates a number of the plurality of pulse waves of the pulse width modulation signal within a soft switching time interval of each of the plurality of cycles of the pulse width modulation signal;

wherein the earlier the pulse wave is generated among the plurality of pulse waves, the smaller the width of the pulse wave is;

wherein the later the pulse wave is generated among the plurality of pulse waves, the larger the width of the pulse wave is.

4. The motor driver according to claim 3, wherein the pulse width modulation calculating circuit, according to a preset off-time signal, sets the pulse width modulation signal to be maintained at a low level within an off-time interval of each of the plurality of cycles of the pulse width modulation signal.

5. The motor driver according to claim 4, wherein the pulse width modulation calculating circuit aligns an upper limit time point of the soft switching time interval of any one of the plurality of cycles of the pulse width modulation signal with a time point of a rising edge of one of a plurality of waveforms of the phase control signal, and aligns a lower limit time point of the off-time interval of the one of the plurality of cycles of the pulse width modulation signal with a time point of a falling edge of the one of the plurality of waveforms of the phase control signal.

6. The motor driver according to claim 5, wherein the pulse width modulation calculating circuit aligns an upper limit time point of the soft switching time interval of a next one of the plurality of cycles of the pulse width modulation signal with the time point of the falling edge of the one of the plurality of waveforms of the phase control signal, and aligns a lower limit time point of the off-time interval of the next one of the plurality of cycles of the pulse width modulation signal with a time point of a rising edge of a next one of the plurality of waveforms of the phase control signal.

7. The motor driver according to claim 4, wherein the pulse width modulation calculating circuit determines time of the off-time interval according to a dead time of the motor driver circuit.

8. The motor driver according to claim 7, wherein the time of the off-time interval is equal to the dead time.

9. The motor driver according to claim 1, wherein a rising edge of any one of a plurality of pulse waves of the commutation starting signal is aligned with a rising edge of a waveform of the phase control signal.

10. The motor driver according to claim 9, wherein a rising edge of a next one of the plurality of pulse waves of the commutation starting signal is aligned with a falling edge of the waveform of the phase control signal.

11. The motor driver according to claim 1, wherein the commutation control circuit includes:

a pulse signal generating circuit connected to the motor position detecting circuit and the pulse width modulation calculating circuit, and configured to output a first pulse signal according to the commutation signal; and a counter connected to the pulse signal generating circuit, and configured to perform a counting operation on the first pulse signal to output a counting signal;

wherein the pulse signal generating circuit outputs the phase control signal and the commutation starting signal according to the counting signal and the preset phase angle.

12. The motor driver according to claim 11, wherein the pulse signal generating circuit includes:

a first pulse signal generator connected to the motor position detecting circuit and the counter, and configured to output the first pulse signal to the counter according to the commutation signal; and a second pulse signal generator connected to the counter and the pulse width modulation calculating circuit, and configured to output the phase control signal and the commutation starting signal according to the counting signal and the preset phase angle.

13. The motor driver according to claim 11, wherein the counter, according to a clock signal, performs the counting operation on the first pulse signal to output the counting signal.

14. The motor driver according to claim 1, wherein the commutation control circuit includes:

a pulse signal generating circuit connected to the motor position detecting circuit and the pulse width modulation calculating circuit, and configured to output a first pulse signal according to the commutation signal;

a counter connected to the pulse signal generating circuit, and configured to perform a counting operation on the first pulse signal to output a counting signal; and a logic circuit connected to the counter and the pulse signal generating circuit, and configured to output the phase control signal and a logic signal according to the counting signal and the preset phase angle;

wherein the pulse signal generating circuit outputs the commutation starting signal according to the logic signal.

15. The motor driver according to claim 14, wherein the pulse signal generating circuit includes:

a first pulse signal generator connected to the motor position detecting circuit and the counter, and configured to output the first pulse signal to the counter according to the commutation signal; and a second pulse signal generator connected to the counter and the pulse width modulation calculating circuit, and configured to output the commutation starting signal according to the logic signal.

16. The motor driver according to claim 14, wherein the counter, according to a clock signal, performs the counting operation on the first pulse signal to output the counting signal.

\* \* \* \* \*